(12) United States Patent
Kelley

(10) Patent No.: US 7,043,489 B1
(45) Date of Patent: May 9, 2006

(54) LITIGATION-RELATED DOCUMENT REPOSITORY

(76) Inventor: Hubert C. Kelley, 2520 N. Vernon St., Arlington, VA (US) 22207

( * ) Notice: Subject to any disclaimer, the term of this patent is extended or adjusted under 35 U.S.C. 154(b) by 415 days.

(21) Appl. No.: 10/081,523

(22) Filed: Feb. 21, 2002

Related U.S. Application Data

(60) Provisional application No. 60/270,631, filed on Feb. 23, 2001.

(51) Int. Cl.
*G06F 17/30* (2006.01)

(52) U.S. Cl. .................................... 707/101; 705/77

(58) Field of Classification Search .................... 707/1, 707/5, 102, 104.1, 103 Y, 101; 705/77
See application file for complete search history.

(56) References Cited

U.S. PATENT DOCUMENTS

| | | | | |
|---|---|---|---|---|
| 5,488,725 A | | 1/1996 | Turtle et al. ................ | 395/600 |
| 5,794,236 A | | 8/1998 | Mehrle ........................ | 707/5 |
| 5,978,811 A | | 11/1999 | Smiley ....................... | 707/103 |
| 5,987,498 A | * | 11/1999 | Athing et al. ............... | 709/203 |
| 6,003,039 A | | 12/1999 | Barry et al. ................. | 707/103 |
| 6,012,074 A | | 1/2000 | Lucas et al. ................. | 707/531 |
| 6,035,281 A | * | 3/2000 | Crosskey et al. ............ | 705/14 |
| 6,098,070 A | * | 8/2000 | Maxwell ..................... | 707/102 |
| 6,289,460 B1 | | 9/2001 | Hajmiragha ................ | 713/200 |
| 6,356,937 B1 | * | 3/2002 | Montville et al. ........... | 709/206 |
| 6,442,529 B1 | * | 8/2002 | Krishan et al. .............. | 705/14 |
| 6,712,702 B1 | * | 3/2004 | Goldberg et al. ............ | 463/42 |
| 2001/0054019 A1 | * | 12/2001 | De Fabrega et al. | |
| 2002/0002469 A1 | | 1/2002 | Hillstrom ..................... | 705/1 |
| 2002/0019937 A1 | | 2/2002 | Edstrom et al. ............ | 713/168 |

OTHER PUBLICATIONS

Thomas W. Malone "Intelligent Information-Sharing System", May 1987, pp. 390-402.*
Kolker, Carlya, "D. C. Goes Electric", published inThe National Law Journal on or about May 21, 2001.
Ronick, Jody, "E-filing of Court Documents Sparks Intense Competition Among New Start-ups", published in the Associated Press State and Local Wire on or about Jun. 20, 2001.
National Law Journal, "Web Site of the Week", published in the National Law Journal on or about Nov. 12, 2001; vol. 24; No. 12; p. B10.

(Continued)

*Primary Examiner*—Jeffrey Gaffin
*Assistant Examiner*—Haythim Alaubaidi
(74) *Attorney, Agent, or Firm*—Andrews Kurth LLP

(57) ABSTRACT

A litigation-related document repository for management and exchange of documents independent of courts or other tribunals. Users can upload litigation-related documents for on-line case folders in order to exchange documents with other parties to a dispute or other users. The repository maintains the documents in a common format in a structured database and can convert the documents for uploading to the database or downloading to user machines. It can also provide various services such as searching for documents and managing case folders. Users can select various fee-based approaches for access to the repository, including paying time-based fees, session-based fees, or agreeing to receive on-line advertisements in exchange for access.

5 Claims, 9 Drawing Sheets

OTHER PUBLICATIONS

Bischoff, Laura A., "Competition in Courthouses", published in The Dayton Daily News on or about Mar. 28, 1999.

Koenig, David, "Courts Moving Into the Internet Age With Electronic Filing of Documents", published in Business News on or about Feb. 24, 2000.

Business Wire, "CourtLink and JusticeLink Announce Intent to Merge; Combination Creates First Internet Gateway To The Nation's Courts", published in Business Wire on or about Feb. 23, 2000.

Goldstein, Alan, "JusticeLink Merger Expected Today; The Combined Legal Documents Firm Would Be Based in Northwewt", published in The Dallas Morning News Section: Business; p. 2D on or about Feb. 23, 2000.

Schiltz, Matthew, "CourtLink Receives $15 Million From Internet Capital Group And Others", press release published on or about Dec. 2, 1999.

Smith, Dan, "County 'donations' Aid State, Money From Fines, Fees Sent to Sacramento", published in The Press-Enterprise on or about Jan. 24, 1996.

The Connecticut Law Tribune, "Tracking the Paperwork", published in The Connecticut Law Tribune on or about Mar. 15, 1999.

Scheffey, Thomas, "West-Lexis Secret Pact Unshrouded", printed in The Connecticut Law Tribune on or about Apr. 3, 2000.

Chalew, Hinda, "Applied Technology; Electronic Filing: Why Law Firms Shouldn't Resist the Changing Tide", published in Legal Tech on or about Mar. 1999, vol. 16; p. 1.

O'Connor, Tom, "E-Filing Update", published in www.lawcommerce.com on or about Apr. 1, 2002.

Leibowitz, Wendy R., "Is There Gold In Them Thar Courts", published in www.wendytech.com/efilingprojects.htm on or about Feb. 12, 2002.

* cited by examiner

LITIGATION-RELATED DOCUMENT REPOSITORY

REFERENCE TO RELATED APPLICATION

The present application is a continuation-in-part of U.S. Provisional Patent Application Ser. No. 60/270,631, entitled "Litigation-Related Document Repository," and filed Feb. 23, 2001, incorporated herein by reference as if fully set forth.

FIELD OF THE INVENTION

The present invention relates to an apparatus, method, and database for managing and processing litigation-related documents without requiring participation by courts or other adjudication entities.

BACKGROUND OF THE INVENTION

Litigation and other dispute resolution processes usually involve paper intensive proceedings. The parties to a dispute must file paper documents with a court or other tribunal and provide copies of the same documents to other parties. The proceedings thus require generation of multiple copies of many paper documents and manual exchange of them. With only paper copies of documents, the parties do not have the opportunity or advantage of computer-based approaches to manage documents electronically and perform various functions on them such as searching.

Some legal resource providers have attempted to provide for electronic exchange of litigation-related documents requiring participation of courts. However, the courts usually have little if any incentive to require that parties provide electronic copies and make them available to a third-party for distribution to others. Without substantial court participation, these providers can only maintain a small fraction of the vast amount of litigation-related documents exchanged every day. Accordingly, a need exists for management and exchange of litigation-related documents without requiring participation of courts or other tribunals.

SUMMARY OF THE INVENTION

A method and apparatus consistent with the present invention compile and maintain documents, including litigation-related documents. The method and apparatus provide for a central repository to store the documents, which are received from authoring entities of the corresponding documents. In the central repository, each of the documents is associated with the corresponding authoring entity, and a subject matter is identified for the documents. The method and apparatus selectively provide access to the stored documents in the central repository, and the selective access can include, for example, uploading new documents, viewing an index or list of the documents, or searching the documents.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
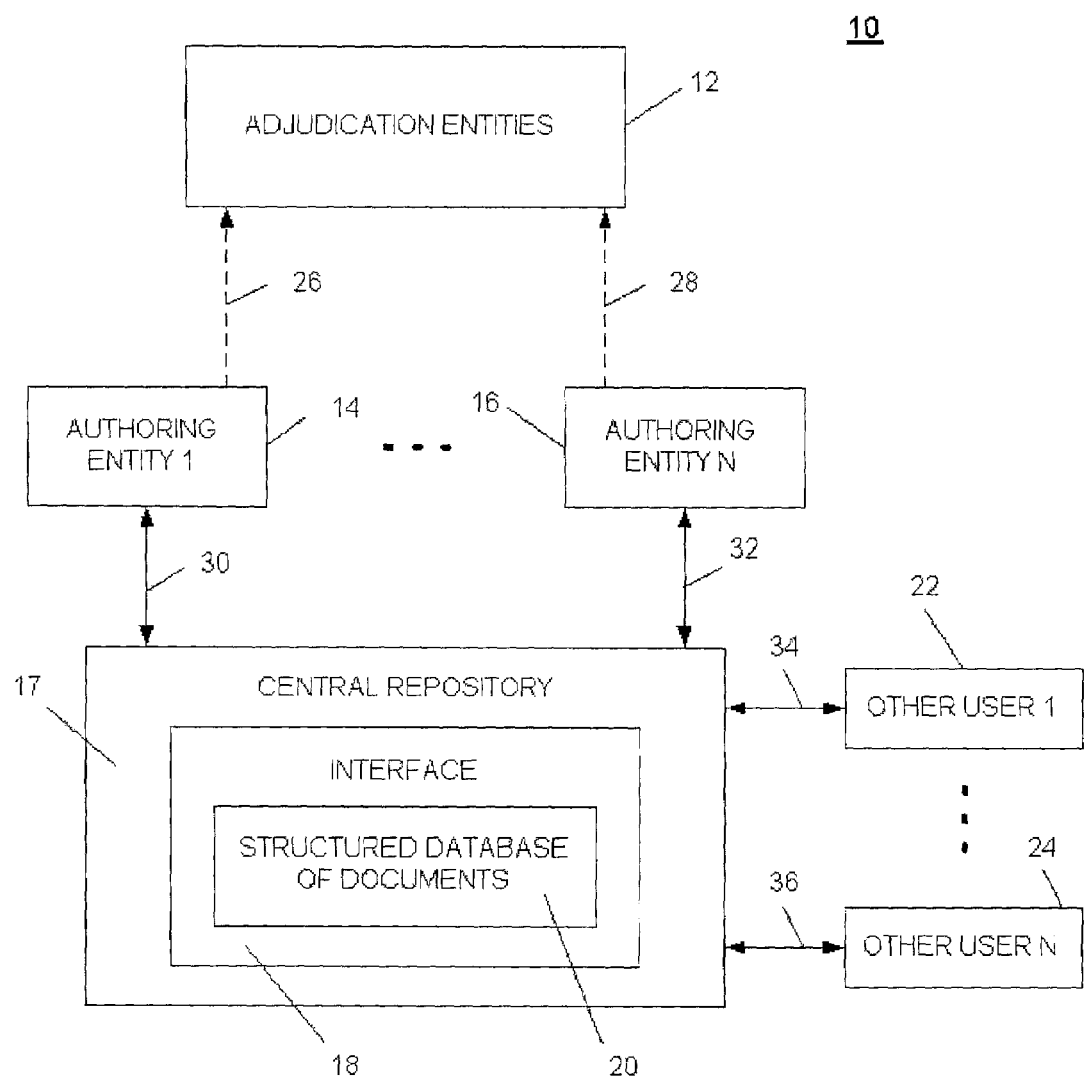
FIG. 1 is a diagram illustrating use of a litigation-related document repository.

An example of an embodiment for implementing the present invention is described in this specification with respect to a company and web site referred to as ezDocket and ezDocket.com. These terms are used for exemplary purposes only, and embodiments of the present invention can be implemented with any type or name of an entity.

Every day, litigants, clients and judges exchange several million documents. By "unbundling" the labor/paper intensive parts from each litigation document transaction and transferring them to an efficient on-line environment, ezDocket can leave the court-sensitive part of the transaction intact, so no courthouse approval or partnership is required. Later, when courthouses do opt-in, ezDocket immediately adapts to include them.

By offering service to individual litigants, clients and/or judges—and not only to court systems or law firms—ezDocket can direct its resources straight to end users with the highest demand and profit potential, again without costly bureaucratic approvals or delays.

This "unbundling" approach lets ezDocket dramatically cut operating expense and user fees, offer flexible terms, and provide service throughout the nation, not one courthouse at a time.

Service providers have traditionally refused to offer on-line docket service unless institutional "bundles"—such as courthouses and law firms—partner with the provider first. If a senior law partner or judge rejects the partnership, then every other lawyer or judge in the "bundle" who wants service is denied access. On the other hand, if the "bundle" accepts service, there is no assurance that the individuals under its authority will use or pay for it.

Consequently, these "all-or-nothing" bundles of service and users are mismatched, creating huge resource misallocation, inefficiency and loss.

ezDocket eliminates these artificial "bundles" and lets individuals use on-line service in the same way they use the courts—one case and one person at a time. At any stage in their lawsuit, arbitration or other dispute, opposing counsel, parties and/or adjudicators can open or join an ezDocket account on any browser and establish a dedicated, neutral, and reliable web site to organize, store, access, search, sort, cut and paste existing filings and discovery exhibits, as well as compose, research and send new material.

Traditional courthouse partnerships offer "bundled" service in a tiny handful of venues and then absorb huge, recurring launch costs for added personnel, travel/housing, training and promotion—all before they even reach a single user in each court's limited market space.

ezDocket, in contrast, offers service everywhere and then lets users self-select, just as they have done with scores of other web services, at little or no cost to the provider. This "viral" marketing approach maximizes service to highefficiency users who generate the greatest revenues at the least expense. It also lets ezDocket cut costs by keeping staff, management and processing in one central location, for example, rather than constantly deploying them to perceived "bundle" sites such as courts and law firms.

ezDocket can let users who do not want to pay fees continue to get service. This encourages sampling, preserves critical user mass and avoids undesirable piecemeal participation in each proceeding. ezDocket can offer no-fee service by selling on-line advertisement space—something that courthouse-regulated partnerships are discouraged from trying. Since the legal-services demographic commands extremely high ad rates, limited advertisement insertion and market survey data generate sufficient revenue to offset or exceed lost user fees.

Since the system is "user-centric"—that is, non-dependent on courthouse approval or employees—ezDocket can also do the following:

(1) respond quickly to user needs, market trends and new user opportunities, as well as decline service to high-maintenance customers (e.g., users who insist on filing everything on paper) without the risk, cost and delay of getting permission from each partner-courthouse, one-by-one, (2) scale system features to let each group of case litigants, judges and/or courts opt-in easily under their own rules, database, security, hardware and other preferences, rather than impose a "one size fits all" set of terms on all user groups, and (3) avoid the awkward conflict-of-interest of soliciting investors to partner with the same courthouses in which the investors themselves may be involved in litigation.

Since it is independent, ezDocket can obtain content from outside sources to offer "click-through" access directly from pleadings to case law and other legal authority.

The ezDocket Solution

A. Overview ezDocket may aim for one type of customer—people who are (a) involved or interested in litigation and (b) use the Internet to save time and money. Since both of these demographics are growing, so is ezDocket's customer base. Since ezDocket links groups of multiple users, site initiators will, in effect, promote—or "virally market"—the system simply by using it, thereby expanding customer base exponentially with each new account they open.

Potential user groups include lawyers, as well as others. Instead of waiting in line to manhandle reams of paper files in stuffy docket rooms, they can access, sort, search, paste and send documents in their case instantly on-line. And they can do it anytime and anywhere in the world having network access.

Their clients can use ezDocket too and constitute other potential user groups. Large, technically savvy corporations with their own in-house counsel, for example, need a fast, cost-efficient way to monitor the status of their lawsuits worldwide without running up outside counsel fees every time they want to see a new filing. These clients can also use ezDocket to monitor their lawyers' performance, without their lawyers ever knowing or charging for it.

Mass-use customers such as class action participants, shareholder-derivative claimants and other broad-based litigation groups can use ezDocket to cut millions in mailing and copying costs alone, as well as for other purposes.

The media, another potential user group, can rely on ezDocket in high-profile cases as an instant source of accurate primary case materials.

Finally, in developed countries with a standardized justice system, every one of these customer groups can use ezDocket for the same reasons as their U.S. counterparts, as well as to avoid time zone, distance and courthouse language barriers.

No judicial bureaucracy needs to set the terms, content, prices or other features of on-line docketing for anyone who wants it. But if courts, arbitrators or other adjudicators do wish to opt-in, and ezDocket's users allow it, then ezDocket can provide adjudicator turnkey access free of charge to encourage judicial acceptance of the service. This can let adjudicators instantly go "live" on-line with no long term contracts, personnel changes, or platform infrastructure commitments, since ezDocket works on existing browsers.

ezDocket need not always mean a user can stop mailing paper to the court—for now, users may still be required to do that until their adjudicator opts in, as described above. But ezDocket does enable users to put most of litigation dataflow on-line immediately.

New users enter personal and billing/credit card information as well as specific information about their case. Sample agreements setting up mutual usage terms, reliance and dispute resolution options can be provided, along with security options and procedures to upload or attach documents, for example in Word or WordPerfect text and Acrobat images. Courts, judges or arbitrators who wish to participate can also have access, subject to the user group consent.

Once authorized, users will see a list of the cases they are allowed to access, along with search, sort and view options available to pick the datafiles, documents and specific lines of text they want to see. Additional services may also be available.

At all times users can have access to ezDocket's 800 number, for example, for live tech support and, on upgraded accounts, verbal recitation of case content where users cannot access a browser. Even if their offices are closed, their staff is gone and their computers are down, ezDocket can still provide content.

B. Exemplary Product Information

Customer Base. ezDocket can be made available to every litigant, counsel and authorized observer in any lawsuit, arbitration, mediation, administrative hearing or other proceeding in the world. No law firm or in-person meeting is required. Anyone or any business can register and get help on-line or by phone and start using ezDocket in a matter of minutes.

Cross-Court Compatibility. ezDocket eliminates cross-jurisdictional incompatibility. Users can access, search and paste filings in all their cases—worldwide and with no jurisdictional roadblocks—in a single session, at one web site and on one account. ezDocket offers court-specific or standardized templates to index and locate documents, even if users are not familiar with local court rules or terminology. Anyone who likes ezDocket can use it over and over again in all their cases.

Dependence on the Court. ezDocket is independent of the court and not subject to the risk of requiring court participation. Therefore, ezDocket is free to generate revenue through on-line advertisements, for example. If customers tolerate limited advertisement placement, ezDocket can use advertisement revenue to supplement or reduce reliance on user fees.

Public or Private Repository. With ezDocket if one or more parties want to use the on-line system only as a private digital repository (e.g., as a closed client/lawyer "intranet"), then they can exclude other parties. Since users, not courts, dictate access terms, users can adapt the system with or without all parties participating, thereby encouraging acceptance, usage and viral marketing.

Choice of Customers. ezDocket can decline customers and, thereby, guarantee that all its files are pure digital text, for example, that can be word and date searched, indexed, cut and pasted into responsive pleadings, client letters, e-mails and other documents, without re-typing or scanning of paper originals. ezDocket is not just a static read-only database but, instead, a vital tool to create, edit and transmit documents between lawyers, clients, news media, and other litigation or adjudication participants.

Flexibility. ezDocket can make changes instantly. In a new and evolving industry, this lets ezDocket respond to changing user preferences, labor supply and market conditions quickly and seamlessly.

Conflict of Interest. Since ezDocket need not be an "arm of the court," ezDocket avoids any potential appearance of impropriety and conflict issue.

C. Revenue Sources ezDocket's three exemplary revenue sources may include user fees, add-on services and advertising/profiling.

1. Fee-based Services ezDocket may charge a flat subscription fee and a fee for downloading of documents. These fees can include, for example, a flat fee based upon a time period; a fee based upon time of use; a fee based upon downloading of the litigation-related documents; a fee based upon uploading of the litigation-related documents to the central repository; or discounted fees based upon particular criteria related to the users.

2. Additional Services

Once on-line at their ezDocket case site, customers may want additional services. These custom features will further condition users to accept and rely on ezDocket-specific as a portal and use its interfaces, software, applications and/or plug-ins to perform the following exemplary services:

(1) customized security, layered authorization to accommodate specific user groups, clients, media, and others, (2) touchtone (telephone) access with automated voice response and/or voice reading of content for users who cannot access a browser, (3) client/attorney liaison services, such as auctioning of packaged legal services, bidding for client legal work, placement of legal personnel, real-time billing updates, and other services, (4) customized templates, cumulative case sites and indexes unique to the law firm, the case party(ies) or other customer group(s), (5) on-line word processing applications and/or real-time multi-user/conference messaging, editing and e-mail directly to and from the user's secured ezDocket site, which allows users to plan, write and send correspondence or briefs without leaving their ezDocket site, (6) access to databases for legal research of case law, regulations, news, corporate data, and other content, via general and direct citation links to partner providers and/or database licensing agreements (this can be particularly useful to access databases that normally charge membership fees; by allowing ezDocket-users to enter a la carte, both sites can cross-promote each other), (7) contract negotiation (e.g., final version trustee), mediation and arbitration services with both on-line-only (using ezDocket) and traditional face-to-face participation, (8) paper-to-digital transition and conversion services including court reporting/transcription, electronic filing, high-capacity scanning (optical character recognition) data conversion services to let users search and edit bulk exhibits, images, video, audio and document production, paper document delivery and filing, retrieval services and referrals.

3. Advertisement, Marketing Data Revenue ezDocket's user base of lawyers and corporate executives represents a high-income and industry-specific demographic that currently commands advertisement fees significantly higher than those charged by mass-media web sites.

As ezDocket attracts other users—such as the media, academics, class action participants, and other user groups—this exposure base can expand and attract a broader range of advertisers.

As ezDocket's customer profile database grows, it can target pop-up advertisements to specific users, search patterns, or other criteria. For example, a professor from a college in Austin might see an advertisement for an academic publication in Texas while lawyers from a firm in Chicago would see a promotion for court reporters in Illinois; pop-up placement effectiveness could be measured by click-throughs, permitting continuous correlation correction.

Customer profile information measuring various data—such as intensity of interest in class action litigation in a key geographic or demographic group—can also be gathered and sold to market analysts as a separate product.

To the extent that certain users may prefer not to see advertising, ezDocket can provide an identical "twin" site offering access to all ezDocket services without advertisements. Users at the twin site will pay an increased fee, for example. Consistent with ezDocket's user-centric approach, the user can be provided the choice.

Independent Litigation Repository Methodology

FIG. 1 is a diagram illustrating a system 10 for implementing the litigation-related document repository methodologies described above. System 10 includes a central repository 17 for storing and managing litigation-related documents in a structured database 20. Central repository 17 stores the documents typically in electronic form and can include or be associated with a separate repository to store hard copies of the electronic documents. As an alternative to electronic storage, central repository 17 can store the documents in one or more of the following exemplary forms: a magnetic media, an optical media, or any non-electronic media.

The documents are received (30, 32) from one or more authoring entities 14 and 16 via an interface 18, providing conversion of documents between various formats. The authoring entities 14 and 16 also usually provide (26, 28) the litigation-related documents to adjudication entities 12. The authoring entities usually include those who prepare the documents but can also include others who submit the documents on behalf of the actual author. The adjudication entities can include courts or other tribunals such as those for mediation, arbitration, or administrative proceedings.

Other users 22 and 24 can also be provided with access to central repository 17 to search and retrieve (34, 36) litigation-related documents from database 20. These users can access litigation-related documents for proceedings to which they are not a party, and they can also access documents for their own proceedings if they are a party to one. Central repository 17 can provide for selective access by the other users and provide for various payment options for the users to access and download documents, as described above with respect to fees. It can also provide for other services in addition to document search and retrieval.

As illustrated in FIG. 1, central repository 17 does not require participation by the adjudication entities 12 to manage and provide the litigation-related documents to users. Rather, the exchange occurs independent of the adjudication entities with central repository 17 functioning in effect as a trusted third party for the documents it manages and maintains. In other words, an entity operating central repository 17 is typically not a part of any litigation or dispute as represented by the litigation-related documents. Although not required, adjudication entities 12 can participate in document exchange via central repository 17.

In acting as a trusted third party, central repository 17 can store the litigation-related documents in read-only form in order to verify to users the authenticity of them. Users can at their own discretion save a document locally in order to modify it for their own purposes; however, with the read-only feature users can be assured of the accuracy and authenticity of the litigation-related documents downloaded from central repository 17. For example, a downloaded litigation-related document from central repository 17 is an exact electronic duplicate of the same document filed with adjudication entities 12. An exemplary implementation using this read-only feature is further explained in the sample user agreement provided in the Appendix.

documents. In particular, each document can be indexed according to one or more of the fields, or one or more types of subject matter.

In Table 1, the link field can specify a stored location or address for the document. The court or other tribunal field can specify the name or jurisdiction of the adjudication entity in which the document is filed. The case number and docket number fields can specify the adjudication entity's number for the case and the number of the docket entry for the document. The title field can specify the title of the pleading or other type of document. The author field can specify the name of the actual author or, for example, the name of a party submitting the document. The activity date field can specify the date and optionally time that the document was submitted to an adjudication entity or the central repository. The key words field can specify any key words or phrases entered for the document. The abstract field can provide a narrative summary of the document or a link to such a summary. The fields shown in Table 1 are provided for illustrative purposes only and different fields can be used. The fields provide for a way to manage, organize, and search the documents. Use of fields in a data structure, such as tables in a relational database, are known in the art.

TABLE 1

| Document Index | | | | | | | | |
|---|---|---|---|---|---|---|---|---|
| link to document | court or other tribunal | case number | docket number | title | author | activity date | key words | abstract |

Figure 2:
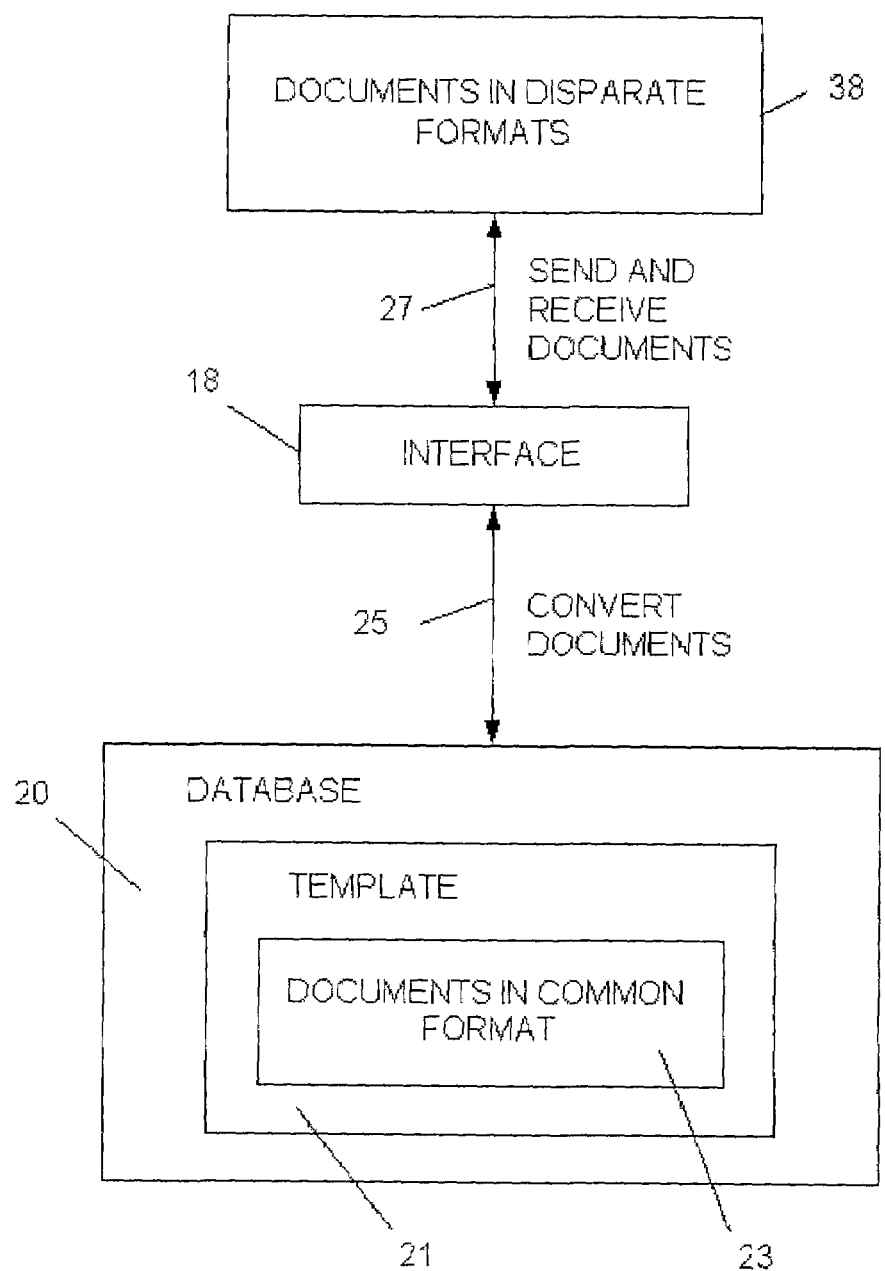
FIG. 2 is a diagram illustrating use of an interface to facilitate document conversion for a litigation-related document repository.

FIG. 2 is a diagram illustrating use of interface 18 to facilitate document conversion for a litigation-related document repository. Interface 18 receives (27) litigation-related documents potentially in disparate formats 38 from the authoring entities or other sources. In particular, users may upload the documents in a variety of word processing program formats or other formats for network distribution of documents such as Portable Document Format (PDF) files. Also, it can even receive the documents in paper format, such as via a mail service, and then scan them into an appropriate format for the database.

Interface 18 converts (25) the documents to a common format 23, for example, for storage in database 20, possibly using a template 21 to place each document in the appropriate format. Conversion between various document formats is known in the art, and interface 18 can be implemented with any programmatic technique to convert between formats. In particular, it can store various algorithms or protocols specifying rules for conversion and can retrieve the appropriate algorithm for the conversion by identifying the input format and desired output format for a document. The format 23 for the documents can be implemented with any type of data structure such as a relational database or an object-oriented database, and the data structure can index and organize the documents according to various criteria or descriptive features.

Table 1 provides an example of an index having various fields that can be associated with each document. Any of the exemplary fields can be used to associate a subject matter with each document, and the term "subject matter" is intended to include any identifying information for a document. The fields can be used to index the litigation-related Interface 18 can also retrieve (25) litigation-related documents from database 20 and convert them into a format requested by a user, for example. These formats may include formats compatible with various word processing programs or other applications, or other formats for network distribution such as PDF files. Interface 18 can use various algorithms, as identified above, for the document conversion. Once converted, interface 18 sends (27) the document to a requesting user.

System for Litigation-Related Document Repository

Figure 3:
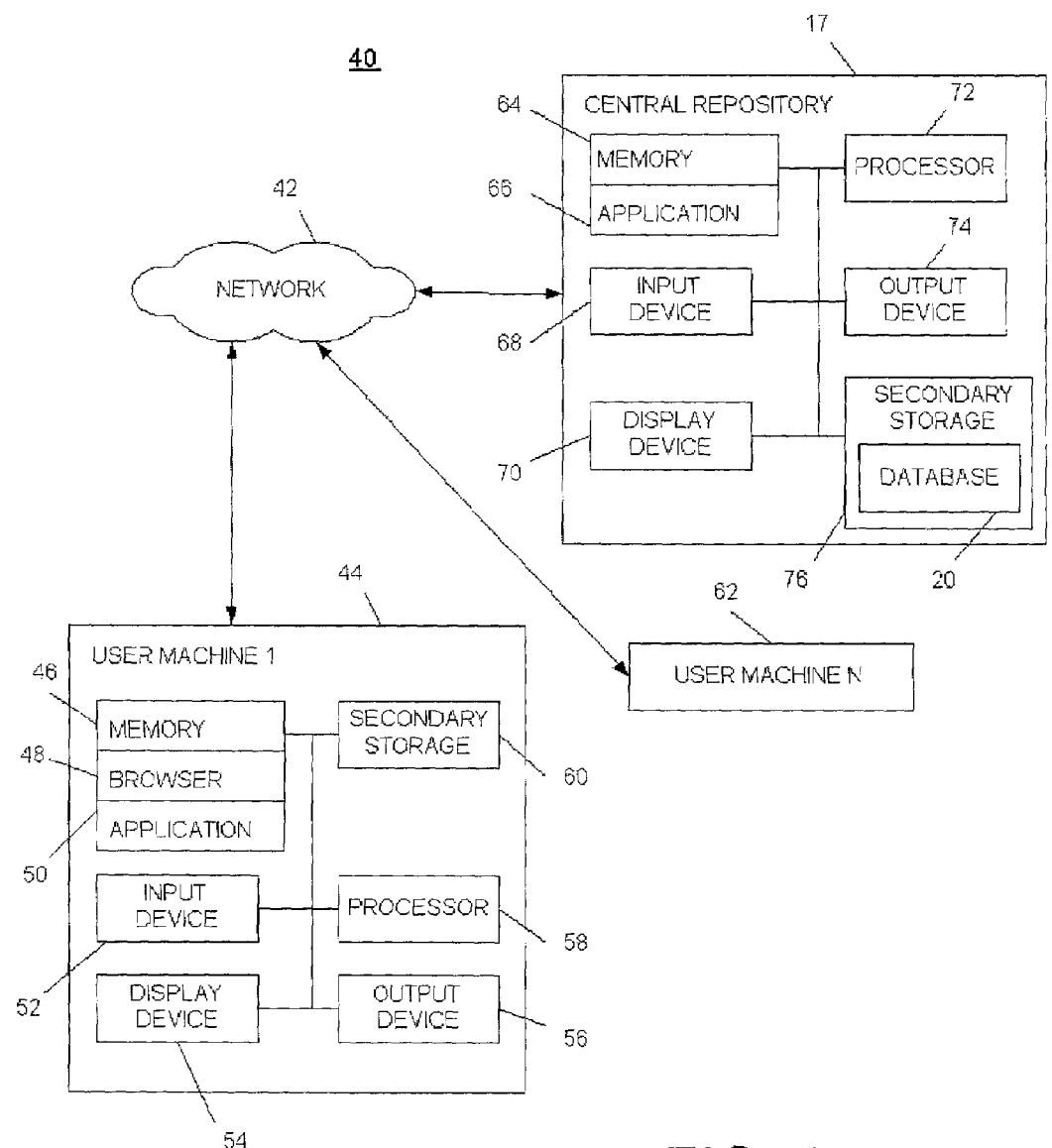
FIG. 3 is a diagram of a system for implementing a litigation-related document repository.

FIG. 3 is a diagram of a system 40 for implementing a litigation-related document repository. System 40 includes central repository 17 for storing and managing the litigation-related documents. Central repository 17 can include, for example, a memory 64, a processor 72 for executing an application 66 stored in memory 64 or other applications, an input device 68 for receiving information or commands, a display device 70 for providing a visual display of information, an output device 74 for outputting information in various forms, and a secondary storage 76 for providing non-volatile storage of database 20. Central repository 17 can interact with one or more user machines 44 and 62 via a network 42 such as the Internet or any other type of distributed wireline or wireless network. Central repository 17 can be implemented with, for example, a server hosting a web site or other electronically accessible network location, and redundant or back-up servers can also be used. Also, system 40 can be scalable to add and delete user machines from the network.

User machine 44 typically includes a memory 46, a processor 58 for executing a web browser 48 or other application 50 stored in memory 46, an input device 52 for receiving information or commands, a display device 54 for providing a visual display of information, an output device 56 for outputting information in various forms, and a secondary storage 60 for providing non-volatile data storage. User machine 62 can include, for example, the same components as user machine 44. Any processor-based device for receiving information from a network and displaying it in pages or screens can be used to implement the user machines. The communications via network 42 can use, for example, protocols known in the art such as Transmission Control Protocol/Internet Protocol (TCP/IP) and HyperText Transport Protocol (HTTP). The information sent for display on the user machines can be formatted, for example, in web pages using HyperText Markup Language (HTML). Browser 48 can include typical browser functions for navigating pages or screens such as forward, back, refresh, and home commands.

Processing for Litigation-Related Document Repository

Figure 4:
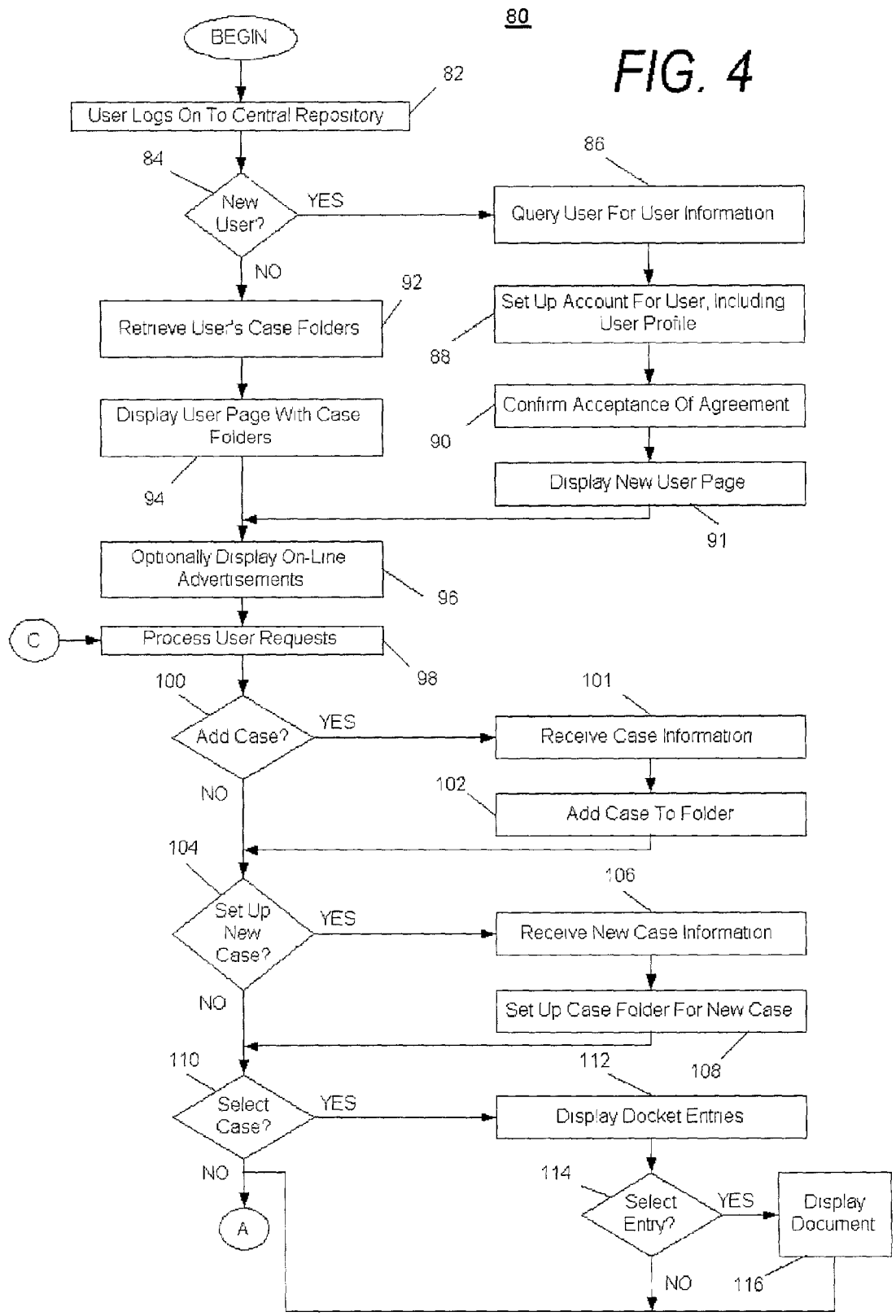
FIGS. 4–6 are a flow chart of a method for processing documents and user requests for a litigation-related document repository.
Figure 5:
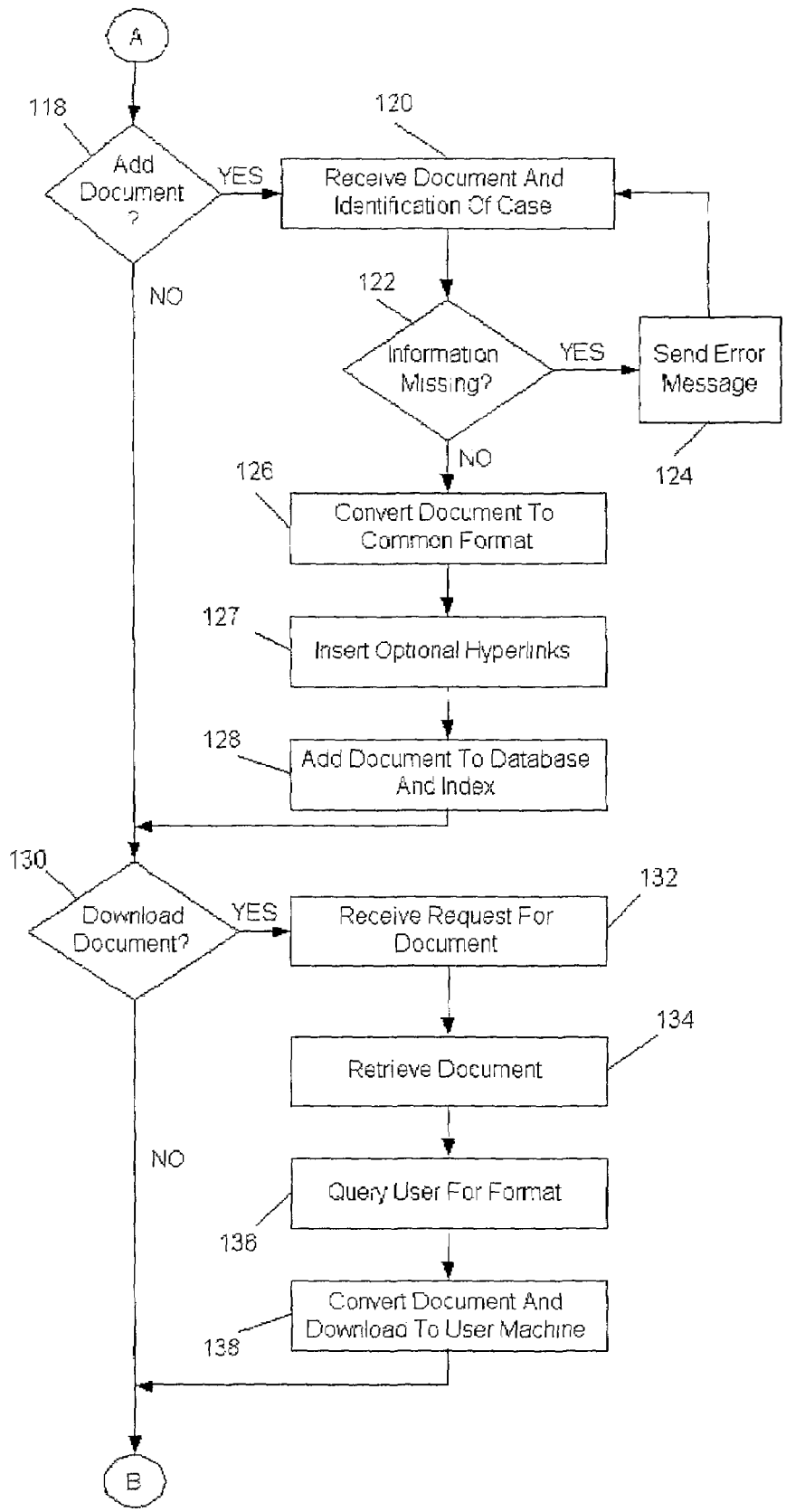
Figure 6:
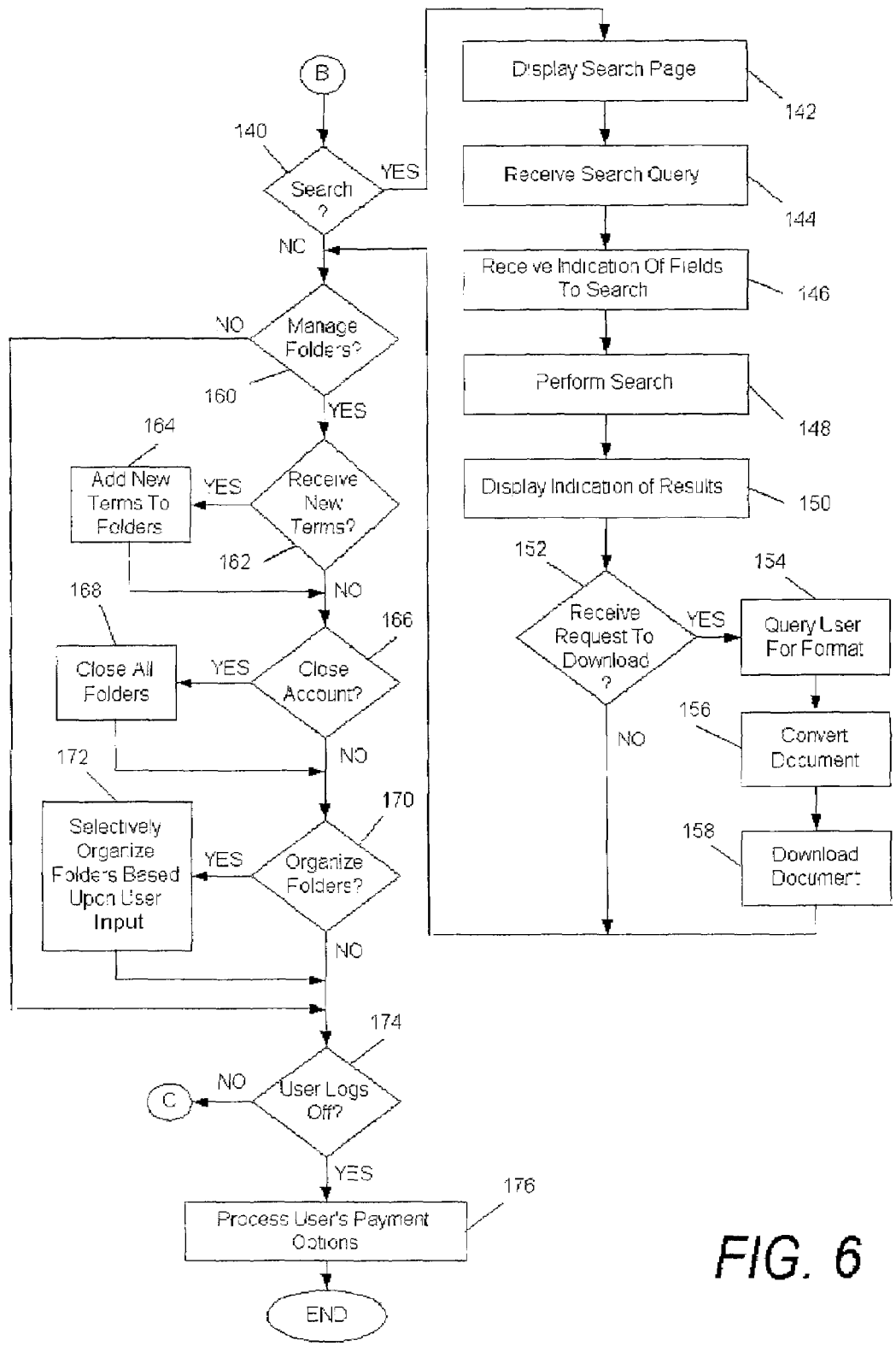

FIGS. 4–6 are a flow chart of a method 80 for processing documents and user requests for a litigation-related document repository. Method 80 can be implemented, for example, in software modules for execution by central repository 17. In method 80, a user at one of the user machines 44 and 62 logs onto central repository 17 (step 82). The log on can occur, for example, by the user accessing a web site via the browser or accessing other types of electronically accessible network locations. For any type of network location, it can include an optional site map for selection and display to the user for navigating the site, and an exemplary site map is provided in Table 2. The site map in Table 2 is provided for illustrative purposes only, and implementations of a litigation-related document repository can use different configurations and features for a network site.

TABLE 2

Exemplary Site Map for Repository Web Site

EzDocket Homepage-Gateway to ezDocket WebSite
    (Contains general text conveying overview of ezDocket and the
    product, probably one banner marquee to display and link to
    current ezdocket news, also could be some advertising offered on
    this page, logon for current users who should be able to enter name
    and password and logon from this page.)
    Opening an account-Creating an ezDocket Account
    (Gives an overview of setting-up an ezDocket account
    including pricing options, most likely credit card only billing
    system, hyperlink to open an account page)
        Open an account-Capture new user information
        Captures the following fields of information:
        Name
        User Type (Lawyer, Pro se Party, etc.) pull down bar selection
        for pre-defined categories.
        Law Firm or Company
        Address
        Phone
        Email Address
        Client (Party in Case)
        Each state admitted and bar number for each state.
        User choice: Non-payment with ads or Payment by Credit
        card, info for billing including
        a system that user can display a monthly billing summary with
        a list of documents added, associated charge and total.
    Agreement Page-Reiterates terms and conditions and has user
    verify that they agree to them. Lists, explains and lets new
    user consent to additional terms.
    Confirmation Page-Either show information missing or TABLE 2-continued Exemplary Site Map for Repository Web Site confirms information has been processed, emails user login
    name and password and separate user upload password.
Existing user login-Screen user gets upon logging in with name
and password. (Welcomes user, displays latest info, to existing
users, ads-ads could appear on all pages under this level, gives the
user their case index (folder-explorer type look and feel), user can
drill down to document index always having same functionality at
each level for add case, add document, search documents, manage
folders, help)
    Displays case folder with following fields of information for
    cases setup by the user in an index format:
        Case # (ezDocket generated unique number when case is
        setup)
        Filing Date
        Case Name
        Plaintiff
        Defendant
        # of entries (Can display # of documents in the case
        folder)
    The fields have ascending/descending sort capability
    Add Case-Allows user to establish a new case or add existing
    case to their case index.
        Add Existing Case-Allows user to add an existing case
        number that's been given to them.
        Captures field:
        Case #
        (Program adds this case folder to their index)
        Setup New Case-Allows user to setup a case folder that
        doesn't exist.
        Captures following fields:
        Case Name
        Plaintiff(s)*
        Address
        Phone
        Email
        Plaintiff's Attorney(s)*
        Address
        Phone
        Email
        Defendant(s)*
        Address
        Phone
        Email
        Defendant's Attorney(s)*
        Address
        Phone
        Email
        Court or Other Forum
        Forum Type (Court, Arbitration, Administrative, etc.)
        Address
        Phone
        Email
        Judge/Adjudicator Assigned
        Case/Docket #
        * info accepts multiple parties and associated
        information.
        Confirmation Page-Either show information missing or
        confirms information has been processed, assigns and
        displays unique ezdocket generated case #, adds case to
        user index, emails user a summary of the case
        information along with assigned case #.
    Add Document-Allows user to upload a document to a folder.
        (Acceptable formats to include WordPerfect, Word,
        HTML, or Text)
        Capture following fields pertaining to the document:
        ezDocket Case Number and User Upload Password
        Parties on Document
        Document Title
        Document Type (e.g. Motion, Answer, etc. pull down
        table standard options plus other option to put in free
        form text.)
        Date Filed
        Attachment(s) (allows user to use explorer-type browser
        to add attachments to the primary document or a free
        form text message indicating availability of the
        attachments)
        User specification of upload as either FILED or NOT

TABLE 2-continued

Exemplary Site Map for Repository Web Site

```
    FILED in court
    Confirmation Page-Either show information missing or
    confirms information has been processed, adds document
    to main root case folder. Discloses that there is a charge
    associated with adding the document, user confirms,
    updates their accounting/billing record
Search Documents-Allows user to search documents.
    Allows users to search on the following:
    Capture fields from Add Document above.
    Bring up a template of case field/document fields allow
    searching on any combination of info in those fields.
    Search for text:
    Check off boxes to search for text in:
    Any field.
    Document.
    Attachment.
    Anywhere (e.g.-entire database available to user).
    Search Results Page-Returns the listing of items found. If
    search items found in a document. Each occurrence of
    the search term(s) should be highlighted and it should be
    easy to move to the next or previous occurrence. User
    should have the option to store queries for future use
    without re-entering.
Manage Folders-Users manage their folders.
    (User should be able to use an explorer/drag and drop
    interface to create and organize documents in a main case
    folder according to their preferences and maintain this
    organization for that particular user. Any new documents
    added will be added to the root case folder until the user
    moves it)
    Add Terms-Allows user to upload consent to additional
    user terms; unanimous consent will result in
    incorporation of terms by ezDocket and all users in each
    case group.
    Close Account-Allows users to discontinue service and
    participation in one or all their cases.
    Help-Allows users to get online help. This should mimic the
    book/index/content searchable user's manual found in most
    programs today.
About ezDocket-More detailed info about ezDocket and its services.
Contact ezDocket-Contact info to reach ezDocket.
    (Ability to email ezDocket via hyperlink)
Demo gives a multimedia overview of service.
    (Should demonstrate users case index view, sorting, searching,
    viewing and uploading document.)
Non-SSL Login-Allows user to login with less security
    (would proceed to existing user login page)
```

Figure 7:
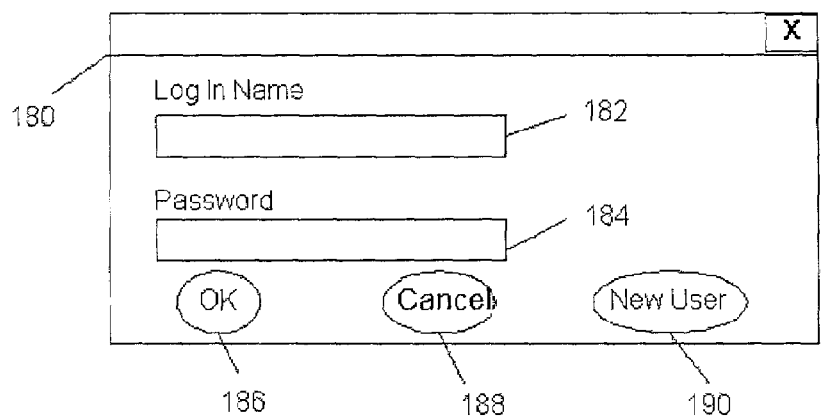
FIG. 7 is a diagram of a log in page.

FIG. 7 is a diagram of a log in page 180. A user can enter a name or other identifier in section 182 and a password in section 184. A user selects section 186 to initiate the log on process or a section 188 to cancel it. A new user can select a section 190 to log onto the central repository 17 without initially requiring a password and to prompt the system to set-up an account for the user.

Therefore, the central repository 17 determines if the user is a new user (step 84) and, if so, it can set-up an account for the user. In particular, the central repository 17 can detect a user's selection of section 190 and query the user for user information such as a name, address, and credit card information for payment (step 86). The central repository 17 sets up an on-line account for the new user, including a user profile (step 88), confirms the user's acceptance of an on-line agreement concerning use of the central repository 17 (step 90), and displays a new user page (step 91). An example of an on-line user agreement for use of the central repository is provided in the Appendix to the present specification.

Also, aspects and features of a more detailed exemplary process for a new user are provided in the sample user agreement in the Appendix and the sample site map in Table 2. As shown in the sample agreement and site map, those additional features can include, for example, a new user identifying authorized users for the new user's group, the new user providing information about other users in the group for marketing or other purposes, and various types of payment options for use of the central repository.

Figure 8:
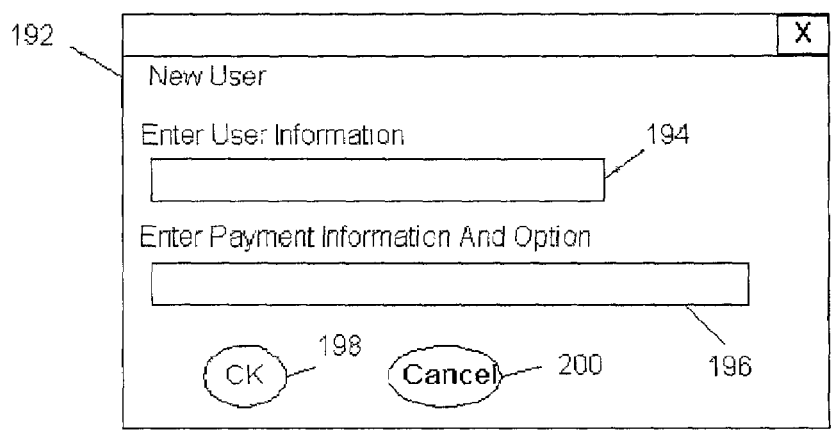
FIG. 8 is a diagram of a new user page.

FIG. 8 is a diagram of a new user page 192. The new user can enter user information in a section 194 and payment information in a section 196. A section 198 can be selected to submit the information, or selection of a section 200 cancels the process. The user information can include, for example, information identifying the user such as a name and address, and it can also include user profile information.

Table 3 provides an example of a data structure for a user account. In Table 3, the user name and password fields can be used to specify the user's log on information. The user profile information field can be used to specify any type of information related to or characterizing the user such as an address, occupation, hobbies, and interests. The payment information and options field can specify a particular option selected by the user, such as one of the fee options identified above, and other information for payment such as a credit card number. The user's case folders field can specify a user's case folders, as explained below, or contain links to them. The fields in Table 3 are provided for illustrative purposes only, and different 110 fields can be used.

TABLE 3

User Account

| user name | user password | user profile information | user's payment information and options | user's case folders |
| --- | --- | --- | --- | --- |

If the user logging onto the central repository 17 is a registered user (step 84), the central repository 17 retrieves the user's case folders (step 92) and displays the user's page with an identification of the case folders (step 94). Central repository 17 can verify the user's log in name and password entered in sections 182 and 184 against database entries for authorized user accounts. The user accounts can be specified in any data structure stored within database 20 or associated with it.

Figure 9:
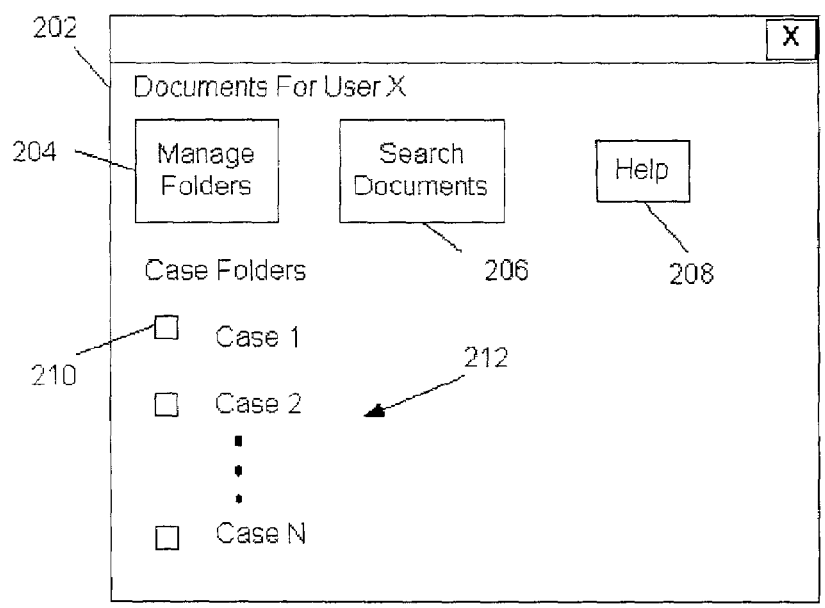
FIG. 9 is a diagram of a user page.

FIG. 9 is a diagram of a user page 202 for display in step 94. The user can select a section 204 to manage folders, a section 206 to search for documents, and a section 208 to obtain on-line help. Page 202 displays a list of case folders 212 for the user, and a case folder can be selected by, for example, "clicking on" the box next to the case name as illustrated by icon 210. The user's case folders can be linked or otherwise associated with the user's on-line account in order for central repository 17 to retrieve and display an indication of them.

The central repository 17 can optionally display on-line advertisements to the user (step 96). The display of these advertisements can occur, for example, as the user's "payment" for access to the system as described above. Central repository 17 can access the user's on-line account in order to detect the user's payment option and thus determine whether to display advertisements to the user. In addition, the advertisements can be selected for display based upon various criteria such as, for example, default information or the user's profile. Therefore, on-line advertisements 1 potentially relating to the user's interests can be selected and targeted to the user. Aside from payment criteria, on-line advertisements can be selected and displayed for other reasons as well.

The central repository 17 then processes user requests received from the user machine (step 98). If the user requests to add a case (step 100), central repository 17 receives from the user case information and adds it to a case folder (step 102). If the user requests to set up a new case (step 104), central repository 17 receives new case information from the user (step 106) and sets up a case folder for it (step 108). The add case and set up case options can be part of, for example, section 204 in page 202 to manage case folders. Also, aspects and features of a more detailed exemplary process for setting up a new case are provided in the sample site map in Table 2. As shown in the sample site map, those additional features can include, for example, use of case codes to access documents without requiring re-entry of other document information.

Figure 10:
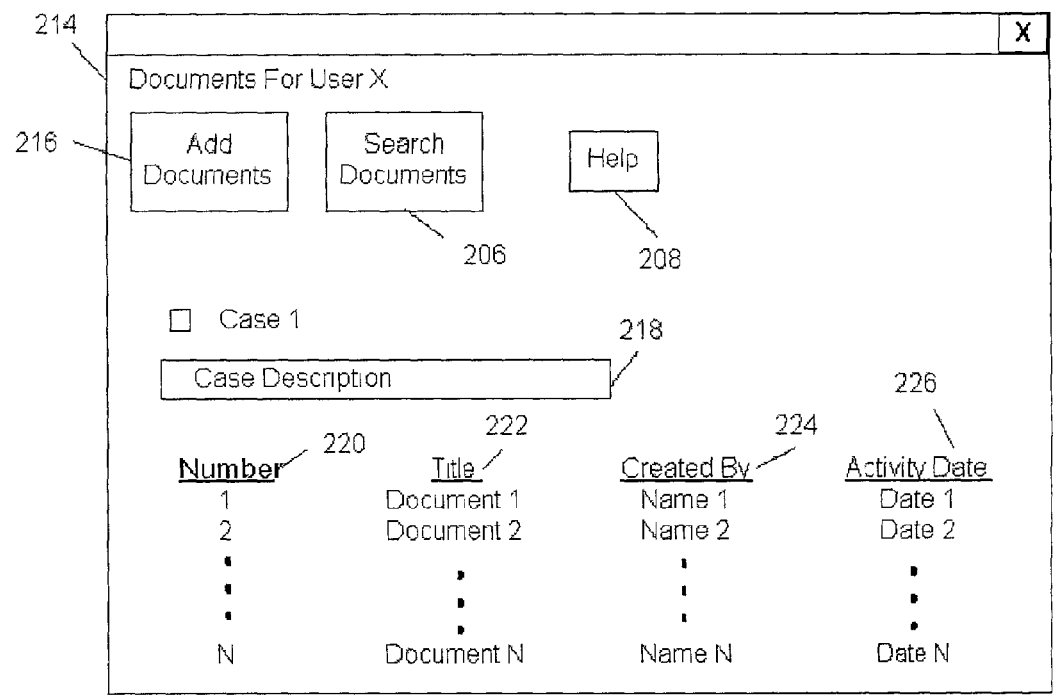
FIG. 10 is a diagram of a document index page.

If the user selects a case (step 110), the central repository 17 displays docket entries for the selected case (step 112). Selection of a case can occur, for example, by the user "clicking on" one of the icons 210 for a case in page 202. FIG. 10 is a diagram of a document index page 214 for displaying docket entries in step 212. Page 214 provides an example of a template for displaying a document, and central repository 17 can include multiple templates for displaying documents in a variety of ways based upon, for example, a user selection or default template.

Upon detecting a user's selection of a case in page 202, the central repository 17 can display page 214 having a case description 218 and docket entries as indicated by a document number 220, title 222, author 224, and activity date 226. The user can select a particular document by, for example, "clicking on" the corresponding document number 220. Fields 220, 222, 224, and 226 can correspond with the information provided in Table 1.

Figure 11:
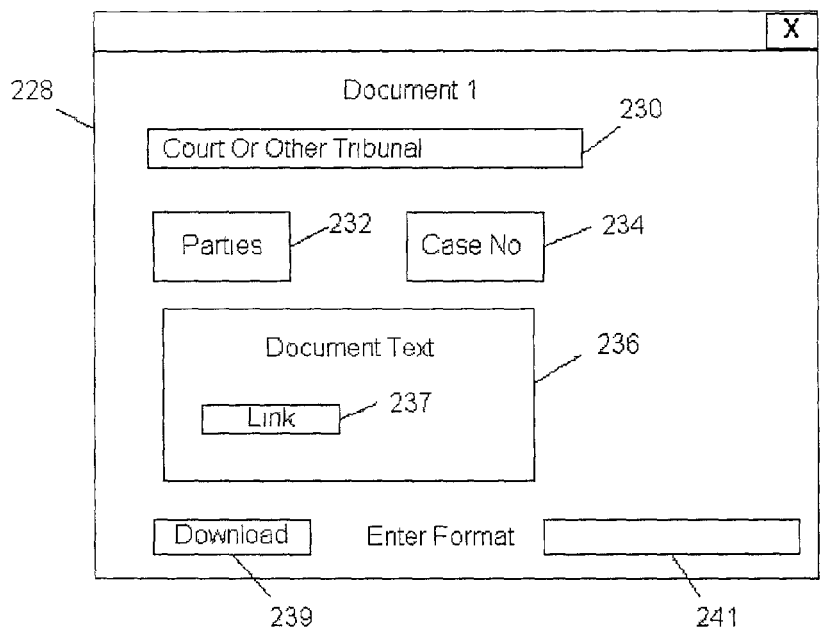
FIG. 11 is a diagram of a document page.

If the user selects a particular displayed entry in page 214 (step 114), the central repository 17 displays the document corresponding with the entry (step 116). Selection of an entry can occur, for example, by the user "clicking on" one of the numbers 220 for the desired document. FIG. 11 is a diagram of a document page 228. Upon detecting a user's selection of a document in page 214, the central repository 17 can display page 228 providing the selected document and related information for it. For example, page 228 can display an indication of a court or other tribunal for the document 230, a listing of the parties to the case 232, a case number 234, the actual document text 236, and possibly one or more hyperlinks 237 embedded in the document text. The hyperlinks can be used to link, for example, exhibits, case law, statutes, secondary authority, other authorities, news sources, or other relevant documents. Page 228 can also include a section 239 for a user to select in order to download the document.

If the user requests to add a document via selection of section 216 in page 214 (step 118), central repository 17 receives from the user the document and an identification of a case for it (step 120). Documents can be added to the central repository in a variety of ways, such as via e-mail or an electronic network transfer via a browser or other application. The documents can include litigation-related documents, other types of documents, and referenced documents, which can include, for example, exhibits or other items referenced by another document.

Figure 12:
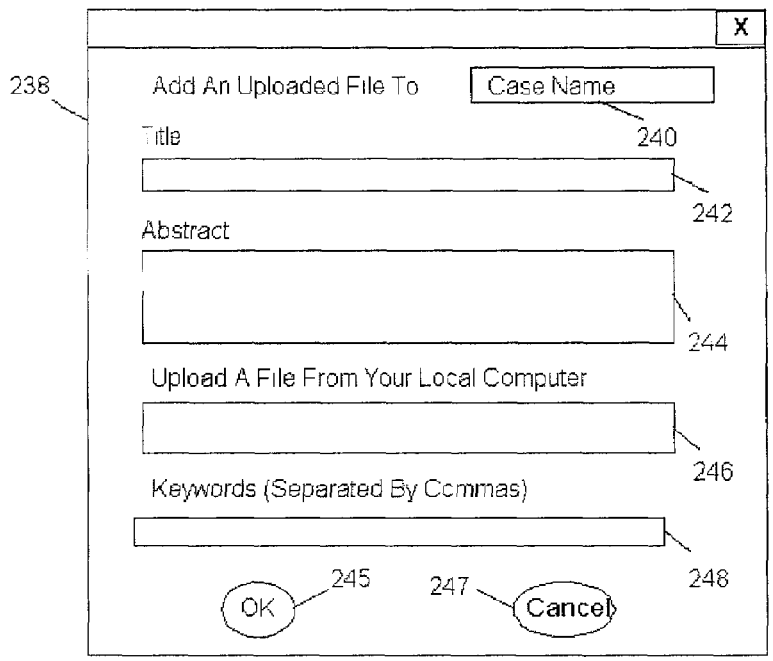
FIG. 12 is a diagram of an upload document page.

FIG. 12 is a diagram of an upload document page 238, which permits a user to electronically add a document to a case and can be displayed to the user by central repository 17 upon detecting selection of section 216. Page 238 includes sections for a user to enter a case name 240, title 242, abstract 244, file name or address 246, and optional key words for indexing or searching purposes 248, and this information can correspond with various fields in Table 1. A user can select a section 245 to upload the file or select a section 247 to cancel the upload.

The central repository 17 determines if any required information is missing from page 238 (step 122) and can provide a message querying the user to obtain the missing information (step 124). Upon receiving the complete information, the central repository 17 converts the document to the common database format (step 126) and inserts optional hyperlinks (step 127). The hyperlinks can be used to link other documents or information to the received document, and examples of hyperlinked information are provided above. In addition, the initial hyperlinks added to the document can be used to dynamically link content to the received document. In other words, each time a user downloads the document from central repository 17, the browser can refresh the hyperlink by using it to retrieve the linked content.

Since a hyperlink generally specifies only an address or pointer to content, the actual linked content can be changed and, upon a user selecting the hyperlink, the browser will retrieve the new linked content. In addition to linking to content, the hyperlinks can be used to link to additional hyperlinks. For example, a first hyperlink can link to a menu listing additional hyperlinks to content, and any of those hyperlinks or content can dynamically change as well. A menu may be implemented to allow the user to select from hyperlink and content options.

The central repository 17 then adds the document to database and indexes it for later searching and retrieval (step 128). The conversion can occur programmatically as explained above.

If the user requests to download a document (step 130), the central repository 17 receives the user's request for a document (step 132) and retrieves the corresponding document (step 134). The central repository 17 also preferably queries the user for a requested format for the document (step 136), and converts the document to the requested format and downloads it to the user machine (step 138). Central repository 17 can convert the document programmatically via interface 18 as described above. Downloading can occur, for example, via a user selecting section 239 in page 228 with a particular format entered in a section 241.

Figure 13:
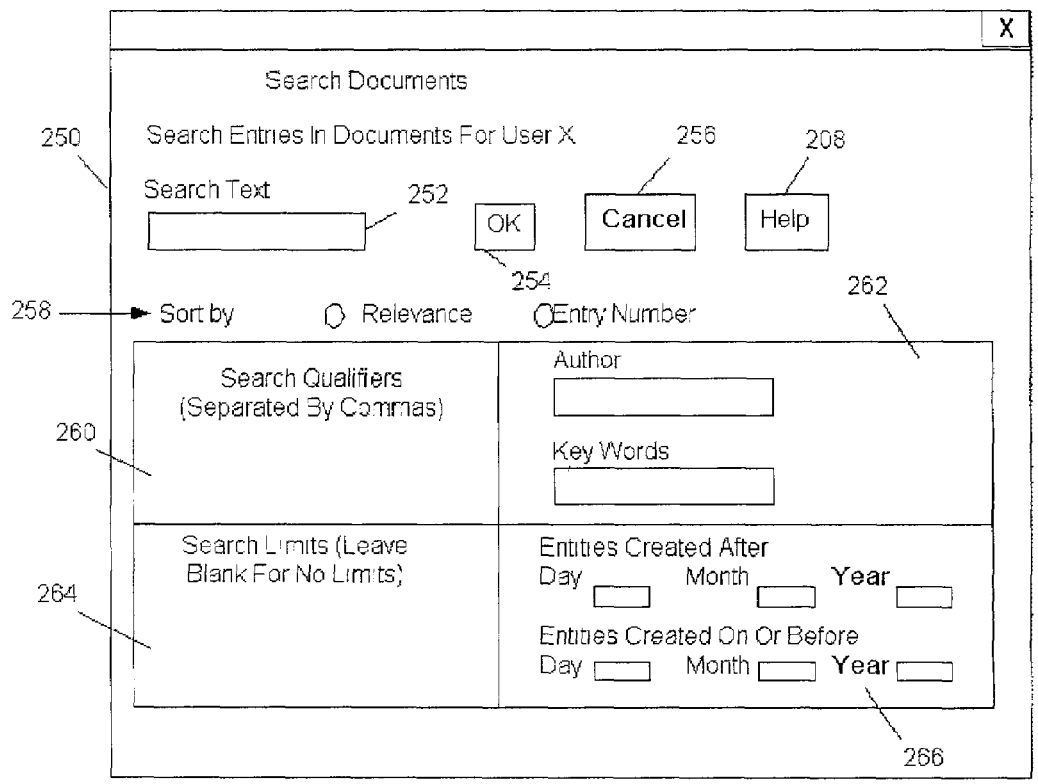
FIG. 13 is a diagram of a search page.

If the user requests to perform a search via selection of section 206 in a relevant page (step 140), the central repository 17 displays a search page to obtain information for the search (step 142). FIG. 13 is a diagram of a search page 250 for display to the user by central repository 17 upon detecting selection of the search option. A user can enter a search query in section 252 and select a section 254 to submit the search or a section 256 to cancel the search. Selection of section 208 provides for the on-line help. A user can select sorting options in section 258 such as sorting search results by relevance or entry number. The user can also enter search parameters or qualifiers. In particular, the user can enter search qualifiers 260, author and key words 262, search limits 264, and time parameters 266.

Upon receiving the search query (step 144) and an indication of fields in which to search (step 146), the central repository 17 performs the search (step 148) and displays an indication of the search results (step 150). The search can be performed using, for example, any type of network search engine. The search results can be displayed, for example, through display of case folders or a listing of located documents. If the user requests to download a document from the search (step 152), the central repository 17 queries the user for a format (step 154), converts the document to the requested format (step 156), and downloads the converted document to the user machine (step 158). Central repository 17 can perform the conversion programmatically using interface 18 as described above.

The central repository 17 also determines if the user requests to manage case folders (step 160), which can occur through the user's selection of section 204 in page 202. If the central repository 17 receives new terms (step 162), it adds or otherwise applies them to the case folders (step 164). If the central repository 17 receives a request to close an account (step 166), it closes all case folders for the account (step 168). If the central repository 17 receives a request to organize folders (step 170), it selectively organizes the case folders based upon user input (step 172).

While the user remains on-line (step 174), central repository 17 can repeat method 80 by returning to step 98 to process the user's requests. In addition to the features described above, examples of more detailed processes relating to the various user requests are provided in the sample user agreement in the Appendix and the sample site map in Table 2. When the user logs off, the central repository 17 can process payment options for the user (step 176) such as the various options described above with respect to fees.

While the present invention has been described in connection with an exemplary embodiment, it will be understood that many modifications will be readily apparent to those skilled in the art, and this application is intended to cover any adaptations or variations thereof. For example, various types of user devices, hardware components for the user machines and central repository, formatting for the pages, types of network transmissions may be used without departing from the scope of the invention. This invention should be limited only by the claims and equivalents thereof.

Appendix

Exemplary On-Line Docketing Service User Agreement

I. Introduction
  WHEREAS,
  1. The undersigned User ("User") is engaged as a party or as counsel to a party in a litigation, arbitration, administrative proceeding or other dispute resolution matter (a "Dispute"), and
  2. The User wishes to send, receive, access, search, sort and index online and in digital format all filings, discovery and other official documents in a Dispute (in general, the "Data" or, with respect to all documents stored by ezD in a Dispute, the "Database") for the purpose of reducing the time and cost of performing some or all of these tasks manually and/or on paper, and
  3. The User wishes to retain ezDocket ("ezD") to perform the tasks of receiving, identifying, date/time stamping, preserving in read-only original form, storing, indexing, searching and making available online via the Internet to User and, on an equal and neutral basis, to other parties to such Dispute (either individually or through their counsel, "Party" or "Parties," with all Parties in a Dispute, including User, together, constituting the "User Group") and such non-Parties as the User Group agrees may have access to this Database, and
  4. The User understands that the court, arbitrator, panel and/or other adjudicator of User's Dispute (the "Forum") may itself elect to retain ezD to receive and send documents to and from the User Group Parties online, rather than on paper, The User agrees as follows:

II. Agreement
  A. Parties
    This ezDocket User Agreement ("Agreement") between User ("User") and ezDocket ("ezD") is entered into on such date as User's online application is Confirmed, as set forth in the confirmation terms below (see "Confirming Your Account").
  B. Opening An Account
    User agrees to complete all information requested of new users set forth in the attached ezD Site Map by entering such information online at www.ezDocket.com. User warrants that all such information is accurate, and will be updated to remain accurate, and that User is authorized to provide all such information on behalf of User's principal, owner or client, if any.
    To the best of ezD's knowledge, no Forums prohibit or restrict the rendering or acceptance of the services contemplated in this Agreement. In the event, however, that User is or becomes aware of any rule, law, regulation, procedure, standard, general or protective order or decree ("legal authority") to the contrary, User agrees to notify ezD of such legal authority immediately by e-mail.
  C. Confirming Your Account
    If User's e-mail address is identical to that which appears in a published law directory, such as the Martindale-Hubbell directory, then ezD will send User's Login Name, Password and Upload Code (as set forth in the attached ezD Site Map) to User's published e-mail address upon receipt of this Agreement in completed form by User. User agrees to be bound to this Agreement upon User's first entry of any of these authorization codes into the ezD website.
    User agrees that User need not send or receive any hand-signed paper, facsimile or electronic image in order to be bound to this Agreement. (Users with non-published e-mail addresses should contact ezD by e-mail for separate confirmation instructions.)
  D. Your Own User Terms
    Notice of ezD Availability to All Parties
    User agrees to contact and to allow ezD to contact all existing Parties to each particular Dispute in which User is a Party, as well as future Parties to such Disputes (as soon as User learns of them), and apprise them that they are entitled to open an ezD account for each such Dispute.
    Mandatory Uploads and Site Use
    User agrees to upload to ezD a document identical to any document User files on paper (or otherwise) with the User Group's Forum. User will complete such upload on the same calendar day as the paper filing to the Forum and no later or earlier than six (6) hours before or after either (a) the time of mailing by U.S. Postal Service or other carrier, or (b) the paper filing date/time stamp by the Forum, whichever is earlier. Since uploads are not accepted by ezD unless they contain the User's unique and confidential User name, password and separate upload code, no additional signature or authentication will be required to identify or verify uploads. (For users who prefer enhanced security through cookies, encryption and/or electronic signature software, ezD will incorporate such measures on an individual basis.) User consents to let ezD e-mail notice and a copy of such uploads to all Parties in User's User Group and to non-parties authorized by the User Group. User agrees to mark uploads not filed in User Group's Forum as "UPLOADED ONLY AND NON-FILED."

User agrees to upload Data to and access ezD and its Database only in accordance with this Agreement and the current online interface and database access procedures set forth in the ezD Site Map. User agrees to review and follow all modifications to this Agreement and these procedures, subject to e-mail notice from ezD. User agrees not to copy (other than for User's own use), appropriate or resell any uploaded document (or portion thereof) from any ezD Database. User agrees not to copy, appropriate or resell for any purpose whatsoever, any content (not including an uploaded document), web page, business method or software from any website, literature or other materials, in any media, owned, created or operated by ezD.

Fees, Ads

User authorizes ezD to charge to User's credit card for each document User uploads to ezD. User will provide User's credit card information to ezD online, as indicated in the ezD Site Map. An additional fee will be charged for each year the document remains in the User Group's Database after the first year or fraction thereof and each byte of data in excess of 50 kbytes (or about 20 pages)/document or fraction thereof. User site visits, downloads, searches, courtesy copies of User uploads and e-mail notices to User of User Group Party uploads are free and incur no User charges.

Alternatively, User may avoid fee obligations by electing to receive service without user fees, as indicated below under "Service Without User Fees."

ezD Services

Upon User account confirmation, as set forth above, ezD will accept uploads from User and identify to User the sender of, date/time stamp, preserve in read-only original form, store, index, provide search capability and engines for, and make available online via the Internet to User and User's User Group each document uploaded to User Group's Database.

In addition, ezD will e-mail to User—along with all User Group Parties and anyone User requests—immediate notice when any Party uploads a document to such User Group's Database.

ezD, like most Forums, does not allow Users to reclaim or revise entries. Documents may not be edited or altered in any way by anyone once User uploads them to ezD. Errors may be addressed only by subsequent uploads, at the User's discretion.

Service Without User Fees

So long as User completes payment within 30 days of billing, ezD will not place advertising material on User's interface while User accesses User's Database.

If User fails or chooses not to make such payment, however, User's account will not be terminated but User will receive advertising impressions while accessing any ezD Database. These impressions will be targeted at the User based on the information User provided when opening User's account and will be used to offset the fees User has declined to pay.

ezD has no preference between Users who pay fees and those who receive advertisements and will otherwise treat both types of Users in the same manner.

E. Your Collective User Group Terms

User Group Term Sheets, Additional Terms

User Groups may add terms to their ezD Agreements by unanimous consent at anytime ("User Group Additional Term"). Suggested additional terms appear in the Sample User Group Additional Term Sheet below.

ezD will incorporate such additional terms once they are uploaded by all Users. If a User Group seeks additional terms not offered in the sample below, ezD will gladly consider them upon request.

If such additional terms are uploaded without unanimous consent, ezD will continue to incorporate the most recent unanimous term combination or, if there has been no prior unanimous consent, ezD will not include any additional terms. So, for example, if Party A wishes to add a term, it can (1) upload its consent first then wait to see if Party B wishes to follow, during which time ezD will not incorporate the term until Party B also consents, or (2) contact Party B to request its advance consent, after which both Parties can upload their consent so ezD can incorporate the additional term.

All uploaded consents to each User Group Additional Term will be stored and accessible to the User Group at all times, just like other uploaded documents. To avoid prejudice and encourage unanimity and predictability, Users may not revoke their consent to a User Group Additional Term for a period of thirty (30) days after uploading such consent.

With respect to those User Group Additional Terms that relate only to the Parties' conduct, rather than on ezD's service, there will be no change in ezD service.

While ezD cannot guarantee any Party's compliance with a User Group Additional Term, ezD will consider noncompliance as grounds for termination of a Party's account, subject to the procedures in the Termination Section below.

SAMPLE USER GROUP ADDITIONAL TERM SHEET—ezD suggests that first time Users incorporate the following terms, designed to anticipate user group comfort levels during the transition from paper to digital docketing. The sequence in which these terms appear is gradual, with less reliance on paper and more reliance on digital docketing over time.

This list also appears and is updated on the ezD online application, where users can check the term(s) they want and upload their consent anytime.

Months 1–3 Recommended Starting Terms for First Time Users

Concurrent Filing. User will continue to file with the Forum and serve Parties on paper while, concurrently, uploading all filings to the User Group's ezD Database and using ezD's online access and services. Neither ezD nor any User will initiate contact with the Forum to disclose that User has retained ezD unless all Parties in the User Group upload their consent. Strongly recommended.

Failure to Timely Upload Identical Documents. User agrees that in the event User fails to timely upload a document identical to the User's filing of the same document on paper (or otherwise) with the User Group's Forum, thereby prejudicing any Party, then User will not seek relief or file a procedural or other claim related to and against such prejudiced Party. For example, if User files a petition in court but fails to timely upload the identical petition to ezD that day, User waives User's objections to respondent's failure to timely oppose such petition or challenge any outcome related to User's petition, since it was not uploaded accurately or on time. Strongly recommended.

Limited Release of Access Codes to Parties. User consents to each User Group Party's confidential and limited disclosure of its access codes and passwords only to disclosees who have an attorney-client relationship or business relationship with the Party, such as unentered counsel, affiliated business executive or Party owner or shareholder. Such access shall not include any Party's upload authorization codes. All uploads will remain the full and exclusive responsibility of each Party.

Court Orders. User agrees to fax to ezD or upload in scanned format to User Group's Database any document User receives from the Forum, such as an order, decree, letter to all Parties or any other document which the Forum makes available to all Parties on paper. User will complete such fax or upload within three business days of receiving such document. (Faxes will be assessed a service fee based on ezD's time and labor needed to convert the fax into digital format for upload to the User Group's Database.)

Dispute Resolution. In the event that a dispute arises between User and any other Party concerning compliance with their ezD Agreement and/or User Group terms, and such dispute is not subject to adjudication in the Forum where the User Group's underlying Dispute is or was adjudicated, then User agrees to have such dispute resolved by and in accordance with the rules of the American Arbitration Association.

Months 4 and After: Terms Allowing Less Paper and More Online Reliance

Discontinuation of Paper Service. User consents to discontinue paper service of document filings to User Group Parties and rely exclusively on ezDocket uploads to complete and accept such service.

Upon any Party's request, uploads by or to such Party will be accompanied by paper service referencing such uploads but excluding the full text of the uploaded documents filings unless also requested. Non-digitally-transferable items such as physical objects or extremely large amounts of data which Parties may prefer to serve via disks, CD or otherwise will continue to be served by physical delivery and are not included in this provision.

In no event will recipients sacrifice the time allowed for responsive filings, which will include the full regular paper mail service time per relevant Forum rules. For example, where Forum rules provide that a respondent's 10 day response time should not begin to accrue until three days after service by mail, a respondent to petitioner's ezD upload and e-mail notice would still have 13 days to respond after the upload.

Filings to the Forum itself will continue on paper and not be affected by this provision.

Forum participation. User consents to allow ezD to advise the User Group's Forum (e.g. Judge, Court Clerk, Arbitrator, etc.) that the Dispute Parties have retained ezD to provide online docketing services and to offer and provide access to the User Group's Database at no charge to the Forum.

ezD will promptly copy to all User Group Parties by e-mail (a) ezD's text contact with the Forum and (b) any text response by the Forum.

If the Forum agrees to retain ezD on terms other than those adopted by the User Group at the time, ezD will not provide access to the Forum unless the User Group unanimously uploads consent to the Forum's proposed terms. If, however, the Forum agrees to retain ezD on the same terms adopted by the User Group at the time, then ezD will provide service to the Forum. In either event, ezD will notify all User Group Parties by e-mail.

F. Account Termination Breach of Mandatory and/or Additional User Group Terms

User may terminate its duties under this Agreement at any time by uploading notice to the User Group Database, as provided in the Site Map. This will immediately notify all Parties in the User Group (and any authorized non-Parties) of User's termination and result in ezD's immediate termination of all User access and security codes.

ezD may terminate its duties to User without cause with thirty (30) days e-mail notice. In addition, ezD may in its sole discretion terminate its duties to User upon User's breach of this Agreement or breach of a User Group Additional Term (to which all Parties have uploaded their consent) so long as ezD provides User fifteen (15) days e-mail notice of such breach and ezD's intent to terminate, during which time ezD will allow User to attempt to cure such breach.

ezD may terminate any Party including User immediately if such Party, in ezD's sole discretion, engages in conduct which exposes ezD to liability, harm or damage of any kind.

Upon actual termination of a User, ezD will immediately notify User and all Parties in the User Group of User's termination.

User agrees to notify ezD immediately by e-mail upon learning that any Party in User's User Group has failed to comply with such Party's User Agreement, including the mandatory upload obligation or any User Group Additional Term(s) to which such Party is bound.

G. ezd Disclosures to Outsiders

Uploaded User Documents and Other Information

Like a court or other Forum, ezD does not seek nor will ezD knowingly accept information that is attorney-client privileged, work-product privileged or subject to protective orders. User should understand that all information that User uploads or otherwise sends to ezD may become known to any Parties in the User Group and their authorized disclosees, and that ezD cannot and shall not be responsible for User's uploading of confidential or proprietary information to ezD.

While ezD will protect User uploads from non-authorized access and will not knowingly disclose Data obtained from Parties to anyone outside their User Groups unless authorized by such groups, ezD may nevertheless be subject to court orders, computer security breaches, unauthorized release of login names and passwords by User Group Parties, or other events which result in disclosure to non-authorized disclosees of information uploaded or sent by User to ezD. In this event, User agrees that ezD's liability will be limited to the actual fees, if any, paid by User to ezD.

General User and Online Information ezD will never knowingly disclose a User's name, address, phone number or e-mail without that User's consent, unless subject to court order. ezD will, however, disclose general information about User site use, profiles and demographics (not including the User's name, address, phone number or e-mail) for market survey and site evaluation or improvement purposes.

G. Additional Terms

Limited Liability/Disclaimer of Warranties

User acknowledges that due to unforeseen communication, computer viruses, processing breakdowns, or other events, ezD may be unable to provide service at any given time and/or may cause harm, loss or consequential damage to User's own computer processing equipment, data or other property, dealings and/or business relations. ezD will in good faith attempt to minimize and eliminate such events. In any and all instances, however, ezD's liability to any User shall be limited to the actual fees, if any, paid by User to ezD.

User further agrees to hold ezD harmless and to indemnify ezD in the event of any third-party claims against User and/or ezD.

ezD provides all services "AS IS WITH ALL FAULTS" AND "AS AVAILABLE" and makes no warranty of any kind, express or implied, as to performance, merchantability, fitness for a particular purpose and non-infringement.

Forum Laws

To the best of ezD's knowledge, no Forums prohibit the rendering or acceptance of the services contemplated in this Agreement. However, ezD cannot and does not warrant the legal status, propriety or exposure to damages, prosecution or other loss associated with User's execution and performance of this Agreement or acceptance of any services provided by ezD. Prospective Users should consult their Forum on these matters if they require more information.

H. Entire Agreement, Review by Counsel

This Agreement constitutes the party's entire Agreement, shall not be construed against the drafter and may not be modified unless in writing, consistent with their prior conduct. User has been advised to retain counsel before executing this Agreement and understands that ezD has been advised by counsel.

I. Arbitration

In the event of any dispute arising between User and ezD relating to ezD and/or any terms of this Agreement, the parties agree to have such dispute resolved by and in accordance with the rules of the American Arbitration Association J. Electronic or Digital Signatures In recognition of the transitional status of state, local, federal and international electronic and digital signature laws, User and ezD each agree to provide each other with their written signatures to this Agreement within five (5) business days of receiving from the requesting party in writing both (a) signed request for such written signature and (b) a copy of this Agreement signed by the requesting party.

Seen and Agreed with No Changes to Text

EZDOCKET.COM
(AGREED UPON ezD E-MAIL TO USER OF USER NAME, PASSWORD AND UPLOAD CODE)

USER
(AGREED UPON CONFIRMATION BY USER'S ENTRY OF SECURITY CODES AT ezD WEBSITE, AS SET FORTH ABOVE)

What is claimed is:

1. A method for providing dedicated online-accessible document storage and handling services, wherein the services are provided by a business entity as a supplement or alternative to public courthouse services, comprising:
receiving, at the business entity, one or more electronic documents from an uploading party per specifications and terms agreed upon by the uploading party and the business entity;
securing the received one or more electronic documents in a non-alterable format into an electronic data repository per the specifications and terms agreed upon by the uploading party and the business entity, wherein the securing includes identifying the uploading party with the received one or more electronic documents and time and date stamping the received one or more electronic documents; and
providing electronic access and searchability of the one or more electronic documents, and contents of the one or more electronic documents, to one or more downloading parties per specifications agreed upon by the one or more downloading parties and the business entity; wherein the specifications and terms agreed to by the uploading party and the business entity include publicly-disclosed and fixed fees charged to the uploading party for the document storage and handling services and prohibit the business entity from providing any other services to the uploading party and the fees charged to the uploading party may be paid for by the uploading party agreeing to receive advertising that generates net revenue for the business entity at least equal to the fees charged.

2. The method of claim 1 wherein the specifications and terms agreed to by the uploading party and the business entity and by the one or more downloading parties and the business entity include publicly-disclosed and fixed fees charged to the uploading party and the one or more downloading parties and require the business entity to provide the document storage and handling services to any uploading or downloading party that agrees to pay the fees or to receive advertising that generates net revenue for the business entity at least equal to the fees charged.

3. The method of claim 1 further comprising:
charging the uploading party and the one or more downloading parties publicly-disclosed and fixed fees for providing the document storage and handling services; and
providing the document storage and handling services to any uploading or downloading party that agrees to pay the publicly-disclosed and fixed fees or to receive advertising that generates net revenue for the business entity at least equal to the fees charged.

4. The method of claim 1 further comprising:
if a downloading party's or the uploading party's identity is disclosed on a website of the business entity, the business entity accepting advertising revenue or investment capital from the identified downloading party or uploading party.

5. A computerized method for compiling and maintaining litigation-related documents, comprising:
receiving litigation-related documents, filed with adjudication entities, from corresponding representatives without requiring submission of the documents by or to the adjudication entities;
maintaining a central repository for electronically storing the litigation-related documents, including:
organizing the litigation-related documents in a data structure;
associating each of the litigation-related documents with the corresponding adjudication entity in which the litigation-related document was filed;
hyperlinking the litigation-related documents with information referenced in the litigation-related documents; and
providing one or more uniform templates for presentation of the litigation-related documents; and
selectively providing access to the stored litigation-related documents based on a fee charged for access or advertising provided in lieu of the fee, wherein specifications and terms agreed to by an uploading party that uploads litigation-related documents and a business entity that accesses stored litigation-related documents, include publicly-disclosed and fixed fees charged to the uploading party for the document storage and handling services and prohibit the business entity from providing any other services to the uploading party and the fees charged to the uploading party may be paid for by the uploading party agreeing to receive advertising that generates net revenue for the business entity at least equal to the fees charged.

* * * * *